United States Patent Office 3,295,926
Patented Jan. 3, 1967

3,295,926
STABILIZATION OF CYANAMIDE
Raymond Henry Janes, Niagara Falls, Ontario, George Jan Novak, Thorold South, Ontario, and Robert Campbell Rawlings, Niagara Falls, Ontario, Canada, assignors to American Cyanamid Company, Stamford, Conn., a corporation of Maine
No Drawing. Filed Feb. 17, 1964, Ser. No. 345,103
6 Claims. (Cl. 23—190)

This invention relates to cyanamide ($H_2NCN$) compositions of improved stability and more particularly to cyanamide solutions of improved stability which are readily and simply prepared.

It is well known that cyanamide in storage, whether in aqueous solution or as a solid product, has a tendency to decompose or react to form urea and dicyandiamide, among other products. The presence of urea in cyanamide solutions results ordinarily in a pH rise through the evolution of ammonia. The rising pH accelerates the formation of dicyandiamide with the result that the rate of cyanamide decomposition is accelerated with the passage of time.

Many efforts have been made to stabilize cyanamide solutions heretofore to thereby improve their shelf life and thus greatly increase the number of applications for, or uses of this material. Usually, such efforts have entailed the use of buffers which function to maintain the pH in that range beneath where dicyandiamide is formed rapidly. Such approaches have met with good success. However, the cyanamide solutions in many instances still tend to decompose too rapidly for such products to be of substantial commercial interest in many areas.

Others have recognized that combinations of organic solvents such as methyl alcohol and a suitable buffering agent such as boric acid are useful to prepare stable solutions of cyanamide. Such solutions have the obvious disadvantage of requiring both the use of an organic solvent and a buffer.

Another solution to this problem resides in the employment of a solvent medium, in which the reactions described above, which result in decomposition, are retarded and hence the stability of cyanamide solutions in such solvents is enhanced. Various organic solvent solutions of cyanamide have been known, but the solvents employed have been characterized by low water tolerance, low flash points, which reduces their commercial acceptance, and solutions for the most part have not achieved the degree of stability necessary for widespread commercial acceptance.

Accordingly, it is an object of the present invention to provide stable cyanamide compositions and particularly stable cyanamide-containing solutions.

A further object of the present invention is to provide stabilized cyanamide solutions having improved stability in which the stabilizing agent is an organic solvent.

It is a further object of the present invention to provide stabilized cyanamide solutions employing organic solvents, which solvents are readily available, have a high tolerance for water, thereby permitting the preparation of solutions having improved stability with substantial water contents, and are characterized by flash points which are consistent with safety standards in manufacture and shipping.

These and other objects and advantages of the present invention will become more apparent from the detailed description thereof set forth hereinbelow.

In accordance with the present invention, a stable composition of cyanamide is provided, comprising cyanamide and a stabilizing amount of a solvent selected from the group consisting of ethylene glycol monomethyl ether acetate, ethylene glycol monoethyl ether acetate and ethylene glycol diacetate.

The cyanamide solution of improved stability may contain from 99 parts of cyanamide to 1 part of solvent to from 1 part of cyanamide to 99 parts of solvent by weight. Preferably, the weight ratio of cyanamide to solvent is from 99 parts of cyanamide to 30 parts of solvent to from 1 part of cyanamide to 70 parts of solvent. Thus, our evidence, as will be seen more clearly hereinafter, has demonstrated that the presence of very minor amounts of the selected solvents identified above does impart definitely improved stability to cyanamide.

One of the principal features of the present invention is that the particular solvents employable in accordance with the present invention are characterized by a high water tolerance and that, so long as the cyanamide to solvent weight ratio referred to above is maintained, final cyanamide compositions of improved stability can be provided which contain from very minor, as for example 1% by weight of the total solution, up to very substantial amounts of water, as for example 60% and even more by weight of the total solution. Preferably, the amount of water employed is an amount of from between about 10 and 50% by weight of the total cyanamide solution.

By "improved stability" as that term is employed herein in reference to cyanamide solutions, it is meant that a 50% cyanamide solution, that is, solutions containing 50% of cyanamide and 50% of a solvent of this invention, will have at a temperature of 122° F. a percent decomposition of less than about 1.5% decomposition per week or will be characterized by a substantially unchanged decomposition rate after the lapse of as much as seven weeks under such test conditions. The conditions specified above, as will be evident, constitute an accelerated test to evaluate the stabilizing influence of various solvents tested.

It has been found that the results of the above accelerated test correlate well with the storage of cyanamide solutions under normal conditions.

Prior to the discovery that constitutes this invention, a substantial number of solvents from a wide variety of classes of organic materials were evaluated in an effort to find solvents which produce suitably stable cyanamide solutions. Thus, alcohols, ethers, esters, ketoesters, aldehydes and ketones, and amides of various descriptions were employed. However, only the use of the three esters above described produced satisfactory stable cyanamide solutions within the meaning of this invention. Thus, ethanol, n-propanol, secondary propanol, n-butanol, tertiary butanol, p-dioxane, diethyl carbitol, dibutyl carbitol, ethyl acetate, butyl acetate, methylaceto acetate, ethylaceto acetate, 2-propanone, N,N-dimethylformamide, butyl Cellosolve acetate, butyl carbitol acetate, and ethyl butyrate were found to be inferior to the solvents of this invention in that either they did not produce the degree of stability specified expressed as a percent decomposition per week, or that the rate of decomposition was not substantially unchanged due to the presence of the solvent for substantial time periods, as for example a seven-week period.

In discovering the unique solvents of this invention, the cyanamide solutions employing the various solvents tested were prepared from crystalline hydrogen cyanamide obtained by crystallization from aqueous solution and subjected to drying in a vacuum oven. Analysis of this material showed it to be greater than 99.5% cyanamide as $H_2NCN$. Impurities were determined to be approximately 0.1% of dicyandiamide and less than 0.1% of urea, with the moisture of the material being approximately 0.1%.

The di-ester, ester-ether derivatives of ethylene glycol employed were obtained from commercial sources and were of technical grade. The alcohols and esters of these alcohols were of reagent grade. Further purification of the solvents was not carried out.

The ageing referred to in the tables hereinafter set forth was carried out in 25 ml. Pyrex glass test tubes which were sealed with polyethylene covered rubber stoppers. The whole content of the tube was taken for each analysis.

The temperature baths employed in incorporating the solvents into the crystalline cyanamide were controlled by means of temperature control instruments capable of maintaining temperatures at from ±0.02° C.

The cyanamide concentrations were measured by means of a modified Pinck procedure described in Cyanamide by Cyanamid (1C–9262–R–3M–8/59), the original Pinck procedure being found in Industrial and Engineering Chemistry, vol. 17, page 459 (1925).

*Stability in various solvents*

In order to demonstrate the improved stability of the compositions of this invention, 50% cyanamide solutions employing various indicated solvents were stored at 122° F. for varying periods expressed in terms of weeks. During these periods, the percent of cyanamide is determined by the Pinck procedure referred to above and the percent of decomposition per week is then readily determined.

The comparative results obtained employing an illustrative number of solvents are set forth in Table I hereinbelow.

*Stability in various esters*

In view of the outstanding results achieved with ethylene glycol monoethyl ether acetate as recorded in Table I, various closely related esters were evaluated in greater detail employing the procedures described hereinabove in connection with Table I and the results of this evaluation are recorded in Table II hereinbelow.

TABLE II.—DECOMPOSITION RATES OF 50% SOLUTIONS OF $H_2NCN$ IN VARIOUS ESTERS AT 122°F.

| Solvent | Test Period (Weeks) | Average Percent Decomposition (per Week) |
|---|---|---|
| Ethylene glycol monomethyl ether acetate | 2 | 0.75 |
|  | 7 | 1.2 |
| Ethylene glycol monoethyl ether acetate | 2 | 1.2 |
|  | 7 | 2.0 |
| Ethyl acetate | 2 | 1.6 |
|  | 7 | 2.6 |
| Ethylene glycol diacetate | 2 | 2.1 |
|  | 7 | 1.9 |
| Ethylene glycol monobutyl ether acetate | 2 | 2.2 |
|  | 8 | 3.6 |
| Butyl carbitol acetate | 2 | 2.6 |
|  | 8 | 4.7 |
| Ethyl butyrate | 2 | 3.7 |
|  | 8 | 9.1 |
| Butyl acetate | 2 | 4.1 |
|  | 8 | 9.9 |

Table II demonstrates that ethylene glycol monomethyl ether acetate, ethylene glycol monoethyl ether acetate and ethylene glycol diacetate are solvents suitable for use in accordance with the present invention. In this regard, it will be noted that ethylene glycol monomethyl ether acetate and ethylene glycol monoethyl ether acetate each have an average percent decomposition per week of less than 1.5, while ethylene glycol diacetate demonstrates the remarkable property of producing no substantial increase in average weight percent decomposition after seven weeks.

*Water tolerance*

In order to demonstrate that the solutions of the present invention maintain their stabilizing effect in the presence of substantial amounts of water, the following solutions were prepared and their stability determined in accordance with the procedure outlined above.

TABLE I.—A GENERAL COMPARISON OF CYANAMIDE STABILITY IN 50% SOLUTIONS AT 122°F.

| Composition | Solvent | Test Period (Weeks) | Percent Decomposition per Week |
|---|---|---|---|
| 98% cyanamide+2% buffer | None | 3 | 24 |
| 50% cyanamide, 48% water, 2% buffer | Water | 1 | 13 |
| 50% cyanamide, 50% solvent | Ethanol | 1 | 18 |
| 50% cyanamide, 50% solvent | n-Butanol | 1 | 17 |
| 50% cyanamide, 50% solvent | p-Dioxan | 3 | 8 |
| 50% cyanamide, 50% solvent | Diethyl carbitol | 2 | 20 |
| 50% cyanamide, 50% solvent | Dibutyl carbitol | 2 | 31 |
| 50% cyanamide, 50% solvent | Ethyl acetate | 2 | 1.7 |
| 50% cyanamide, 50% solvent | Ethylene glycol monoethyl ether acetate | 2 | 1.3 |
| 50% cyanamide, 50% solvent | Methyl acetoacetate | 2 | >35 |
| 50% cyanamide, 50% solvent | Ethyl acetoacetate | 2 | >35 |
| 50% cyanamide, 50% solvent | 2-Propanone | | (¹) |
| 50% cyanamide, 50% solvent | N,N-Dimethylformamide | 2 | 7.7 at 104° F. |

¹ Decomposes rapidly after a few days.

It will be seen from Table I above that only ethylene glycol monoethyl ether acetate produces a stable cyanamide solution in accordance with the present invention.

TABLE III.—DECOMPOSITION RATES OF CYANAMIDE-ETHYLENE GLYCOL MONOETHYL ETHER ACETATE-WATER SOLUTIONS AT 122° F.

| Ratio Ethylene glycol monoethyl ether acetate=:H$_2$NCN | Percent H$_2$O | Percent Decomposition (per week) | |
|---|---|---|---|
| | | After 1 week | After 2 weeks |
| 0 | 0 | 83 | (¹) |
| 0 | 10 | 70 | (¹) |
| 0 | 50 | 21 | ------- |
| 0.01 | 0 | 49 | 39 |
| 0.01 | 10 | 43 | 36 |
| 0.05 | 0 | 23 | 22 |
| 0.05 | 10 | 18 | 18 |
| 0.04 | 50 | 6.4 | 36 |
| 0.19 | 0 | 4.0 | 6.5 |
| 0.17 | 10 | 5.3 | 7.3 |
| 0.16 | 50 | 3.8 | 4.4 |
| 0.35 | 0 | 2.3 | 2.9 |
| 0.35 | 50 | 1.4 | 2.1 |
| 1.04 | 0 | 0.6 | 1.1 |
| 1.00 | 2 | ------- | 1.0 |
| 1.05 | 10 | 1.7 | 1.1 |
| 1.06 | 30 | 0.6 | 1.0 |
| 1.00 | 50 | 1.5 | 1.4 |
| 3.00 | 0 | 0.6 | 0.3 |

¹ Complete.

The above data not only demonstrates the water tolerance of the solvents of this invention over a wide range of concentrations, but further demonstrates that the presence of water in the solution actually inhibits decomposition, at least up to the point where the ethylene glycol monoethyl ether acetate to cyanamide ratio is about 1.

In addition, Table III demonstrates that even the presence of minor amounts of solvent substantially improves the stability of cyanamide in accordance with this invention. Compare the above results for a 100% cyanamide and a 50% cyanamide solution, in water.

It will be apparent that other materials may be incorporated into the compositions of this invention, at least to the extent that they do not interfere significantly with the stabilizing influence of the solvent employed.

We claim:
1. A stable cyanamide composition comprising cyanamide and a stabilizing amount of solvent selected from the group consisting of ethylene glycol monomethyl ether acetate, ethylene glycol monoethyl ether acetate and ethylene glycol diacetate.

2. A stable cyanamide composition comprising cyanamide and ethylene glycol monoethyl ether acetate.

3. A stable cyanamide composition comprising cyanamide and a solvent selected from the group consisting of ethylene glycol monomethyl ether acetate, ethylene glycol monoethyl ether acetate and ethylene glycol diacetate, said cyanamide and said solvent being present in said composition in relative weight ratios of about 99:1 to about 1:99, cyanamide to solvent, respectively.

4. A stable cyanamide composition comprising cyanamide and ethylene glycol monoethyl ether acetate, said cyanamide and said acetate being present in said composition in relative weight ratios of about 99:1 to about 1:99, cyanamide to acetate.

5. A stable cyanamide composition comprising cyanamide and a solvent selected from the group consisting of ethylene glycol monomethyl ether acetate, ethylene glycol monoethyl ether acetate and ethylene glycol diacetate, and water, said cyanamide and said solvent being present in said composition in relative weight ratios of about 99:1 to about 1:99, cyanamide to solvent, respectively, said water being present in an amount up to 50% by weight of the total composition.

6. A stable cyanamide composition comprising cyanamide and ethylene glycol monoethyl ether acetate and water, said cyanamide and said solvent being present in said composition in relative weight ratios of about 99:30 to about 1:70, cyanamide to solvent, respectively, said water being present in an amount up to 50% by weight of the total composition.

References Cited by the Examiner

UNITED STATES PATENTS 2,982,616   5/1961   Sugino et al. _____ 23—190
3,181,932   5/1965   Foreman et al. _____ 23—190

OTHER REFERENCES

Williams: Cyanogen Compounds, 1948, p. 18–23.

OSCAR R. VERTIZ, *Primary Examiner.*

J. BROWN, *Assistant Examiner.*